United States Patent
Ishimura

(10) Patent No.: US 10,953,812 B2
(45) Date of Patent: Mar. 23, 2021

(54) VEHICLE-MOUNTED DEVICE

(71) Applicant: ALPINE ELECTRONICS, INC., Tokyo (JP)

(72) Inventor: Shunichi Ishimura, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/750,768

(22) Filed: Jan. 23, 2020

(65) Prior Publication Data
US 2020/0262358 A1  Aug. 20, 2020

(30) Foreign Application Priority Data
Feb. 14, 2019  (JP) .............................. JP2019-024163

(51) Int. Cl.
*B60R 11/02* (2006.01)
*B60R 11/00* (2006.01)

(52) U.S. Cl.
CPC ... *B60R 11/0235* (2013.01); *B60R 2011/0066* (2013.01); *B60R 2011/0085* (2013.01)

(58) Field of Classification Search
CPC ......... B60R 11/0235; B60R 2011/0066; B60R 2011/0085; B60R 11/0229; B60R 11/02; B60R 2011/0003; B60R 2011/0015; B60R 2011/0028; B60R 2011/0005
USPC ...................................................... 248/205.1
See application file for complete search history.

(56) References Cited

U.S. PATENT DOCUMENTS

| 7,388,755 B2 * | 6/2008 | Chen ..................... G06F 1/1601 312/223.1 |
| 2003/0174463 A1 * | 9/2003 | Chen .................. B60R 11/0252 361/679.26 |
| 2004/0173714 A1 * | 9/2004 | Nakamura .......... B60R 11/0235 248/27.1 |
| 2005/0247839 A1 * | 11/2005 | Huang ................... F16M 13/02 248/309.1 |

(Continued)

FOREIGN PATENT DOCUMENTS

| EP | 2 676 847 | 12/2013 |
| JP | 2016 130037 | 7/2016 |
| JP | 2016-130037 | 7/2016 |

OTHER PUBLICATIONS

Extended European Search Report for 20 15 5526 dated May 6, 2020, 8 pgs.

*Primary Examiner* — Muhammad Ijaz
(74) *Attorney, Agent, or Firm* — Brinks Gilson & Lione

(57) ABSTRACT

A device base which is part of a device main body includes a support fixing portion having a support member fixed thereto and the base main body portion which is the other portion of the support fixing portion. A preferential rupture portion is formed between the support fixing portion and the base main body portion. The rupture fixed portion having the support fixing portion fixed to the support member has a hook member attached thereto, which is formed with a metal plate having elasticity. A hooking portion at the front end of the hook member faces an inner side portion of the base main body portion. If the preferential rupture portion ruptures due to an impact force, the hooking portion is hooked to the inner side portion, and the device main body is prevented from falling down from the rupture fixed portion.

16 Claims, 9 Drawing Sheets

(56) References Cited

U.S. PATENT DOCUMENTS

| | | | | |
|---|---|---|---|---|
| 2006/0006093 A1* | 1/2006 | Yang | ............... | B60R 11/0235 |
| | | | | 206/701 |
| 2006/0113774 A1* | 6/2006 | Hirose | ............ | B60R 21/2338 |
| | | | | 280/731 |
| 2008/0040887 A1* | 2/2008 | Dickerson | ........ | E05D 11/087 |
| | | | | 16/342 |
| 2009/0090476 A1* | 4/2009 | Grandel | .......... | B60R 11/0235 |
| | | | | 160/368.1 |
| 2009/0251624 A1* | 10/2009 | Ikunami | ........... | B60R 11/0235 |
| | | | | 348/837 |
| 2010/0226086 A1* | 9/2010 | Kissel | ............ | B60R 11/0235 |
| | | | | 361/679.21 |
| 2015/0008299 A1* | 1/2015 | Lee | ................ | B60R 11/0235 |
| | | | | 248/286.1 |
| 2016/0345045 A1* | 11/2016 | Liu | ............... | H04N 21/43076 |
| 2017/0113551 A1* | 4/2017 | Schaellert | ........... | B60K 37/00 |
| 2019/0375342 A1* | 12/2019 | Mullen | .......... | B60R 11/0235 |
| 2020/0262357 A1* | 8/2020 | Kuchibhatla | ..... | H05K 5/0017 |
| 2020/0262358 A1* | 8/2020 | Ishimura | ......... | B60R 11/0235 |

\* cited by examiner

VEHICLE-MOUNTED DEVICE

RELATED APPLICATION

The present application claims priority to Japanese Patent Application Number 2019-024163, filed Feb. 14, 2019, the entirety of which is hereby incorporated by reference.

BACKGROUND

1. Field of the Invention

The present invention relates to a vehicle-mounted device, such as a vehicle-mounted display device and, in particular, to a vehicle-mounted device that reduces an impact when an external force acts on the device main body, and a portion thereof around the support portion of a support member breaks so that the device main body does not fall off from a fixed portion of the support member.

2. Description of the Related Art

Japanese Unexamined Patent Application Publication No. 2016-130037 describes an invention related to a vehicle-mounted display device equipped with a display panel.

The vehicle-mounted display device has a support. The support includes a panel support portion that supports the display panel from the back side and a base portion that extends rearward from the lower side. The base portion is installed on a dashboard or an instrument panel in the vehicle interior. The support is formed by die-casting using a magnesium alloy, which is a metal material that is easily broken. The support has a curved portion between the panel support portion and the base portion. The curved portion includes a preferential rupture portion having a partially reduced thickness. A connecting metal plate having one end fixed to the panel support portion and the other end fixed to the base portion is provided. The connecting metal plate has a bent portion formed in an intermediate piece of the connecting metal plate.

According to the vehicle-mounted display device, if an excessive impact force is exerted on the panel support portion of the support or the display unit held by the support, the support is ruptured at the preferential rupture portion. Thus, the panel support portion separates from the base portion. At this time, the bent portion of the connecting metal plate connecting the panel support portion extends, so that the connecting plate is bent. In this manner, even when the preferential rupture portion ruptures, the panel support portion can be prevented from being separated from the base portion and falling off. Furthermore, since the panel support portion is restored such that it rises with the elastic restoring force of the connecting metal plate after the preferential rupture portion ruptures, exposure of a ruptured surface of the preferential rupture portion to the vehicle interior can be prevented.

In the vehicle-mounted display device described in Japanese Unexamined Patent Application Publication No. 2016-130037, a preferential rupture portion is formed between a lower end of a panel support portion of a support and the base portion. In addition, the connecting metal plate is provided in a lower portion of the support. For this reason, after the support is ruptured at the preferential rupture portion, the panel support portion and the display panel supported by the panel support portion are supported only by the connecting metal plate from below. Because the panel support portion and the display panel have a considerably large mass, the strength of the connecting metal plate needs to be high. Accordingly, a large connecting metal plate is required to support the panel support portion and the display panel from below. Moreover, to provide a large connecting metal plate, the curved portion of the support member needs to be large, which leads to an increase in size of the device.

Furthermore, the structure described in Japanese Unexamined Patent Application Publication No. 2016-130037 requires the curved portion and the base portion at the lower end portion of the support body to greatly extend rearward. Accordingly, the depth of the device increases. Therefore, it is difficult to apply this approach to a structure including a support having a small depth, resulting in insufficient flexibility of design.

SUMMARY

Accordingly, it is an object of the present disclosure to provide a vehicle-mounted device capable of reducing an impact of an external object, such as the human body, on the device main body by rupturing part of a device base portion of the device main body. In addition, it is an object of the present disclosure to provide a vehicle-mounted device having relatively small structure for preventing the device main body from falling off from a support member.

According to the present disclosure, a vehicle-mounted device includes a device main body, a device base that is part of the device main body, and a support member configured to support the device base on a vehicle side. The device base has formed therein a support fixing portion to which the support member is fixed, a base main body portion other than the support fixing portion, and a preferential rupture portion between the support fixing portion and the base main body portion. The support fixing portion and the support member attached to the support fixing portion constitute a rupture fixed portion, and the base main body portion is separable from the rupture fixed portion if the preferential rupture portion ruptures. One of the rupture fixed portion and the base main body portion is provided with a hook member, and the hook member is provided with a hooking portion that is hooked to the other when the base main body portion separates from the rupture fixed portion.

In the vehicle-mounted device according to the present disclosure, preferably, the device base is provided with a base wall, and the support fixing portion and the base main body portion are part of the base wall.

In the vehicle-mounted device according to the present disclosure, the hooking portion of the hook member may be provided at least at two points that sandwich the support fixing portion.

In the vehicle-mounted device according to the present disclosure, the hook member may be attached to the rupture fixed portion, and the hooking portion is hookable to an inner side portion of the base main body portion facing the inside of the device main body.

In the vehicle-mounted device according to the present disclosure, preferably, the hook member is formed with a metal plate having elasticity, the metal plate has a folded-back portion, and a front end portion of the folded-back portion serves as the hooking portion. The device base has a hole portion formed therein between the support fixing portion and the base main body portion, and the hook member is elastically deformed and passes through the hole portion so that the hooking portion is hookable to the inner side portion of the base main body portion.

Furthermore, in the vehicle-mounted device according to the present disclosure, preferably, the support member and the hook member are attached to the support fixing portion by using the same fixing screw.

In the vehicle-mounted device according to the present disclosure, the hook member may be attached to the base main body portion, and the hooking portion is hookable to an outer side portion of the rupture fixed portion facing the outside of the device main body. Even in this case, it is preferable that the hooking portion is formed with a metal plate having elasticity.

According to the present disclosure, when an impact is externally applied to the device main body, the preferential rupture portion of the device base ruptures. In this manner, the impact force exerted on, for example, the human body that hits the device main body can be reduced. In addition, if the preferential rupture portion of the device base ruptures, the hooking portion of the hook member provided on one of the base main body portion of the device base and the rupture fixed portion formed by the support fixing portion having the support member attached thereto is hooked to the other. In this manner, the device main body is prevented from falling down from the support member.

According to the present disclosure, falling down of the device main body is prevented by the hooking portion of the hook member provided in one of the base main body portion and the rupture fixed portion. Accordingly, the depth of the hook member and a structure for attaching the hook member can be reduced. In addition, falling off of the device main body can be prevented by hooking the hooking portion of the hook member. As a result, unlike an existing vehicle-mounted device, the entire mass of the device main body need not be supported by a metal member. A relatively small hook member can support the device main body so as to prevent the device main body from falling off.

DETAILED DESCRIPTION OF THE PREFERRED EMBODIMENTS

Figure 1:
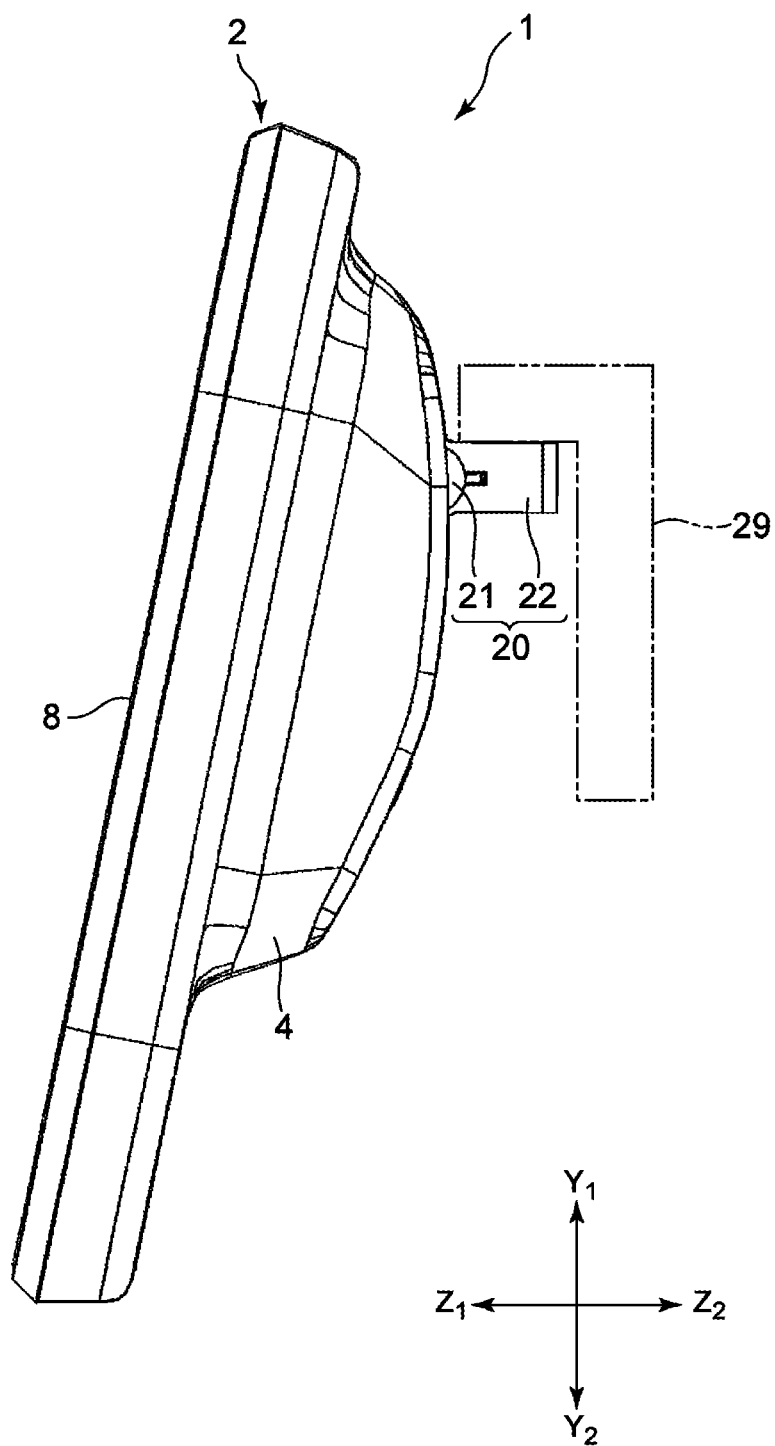
FIG. 1 is a side view of a vehicle-mounted device according to a first embodiment of the present invention.
Figure 2:
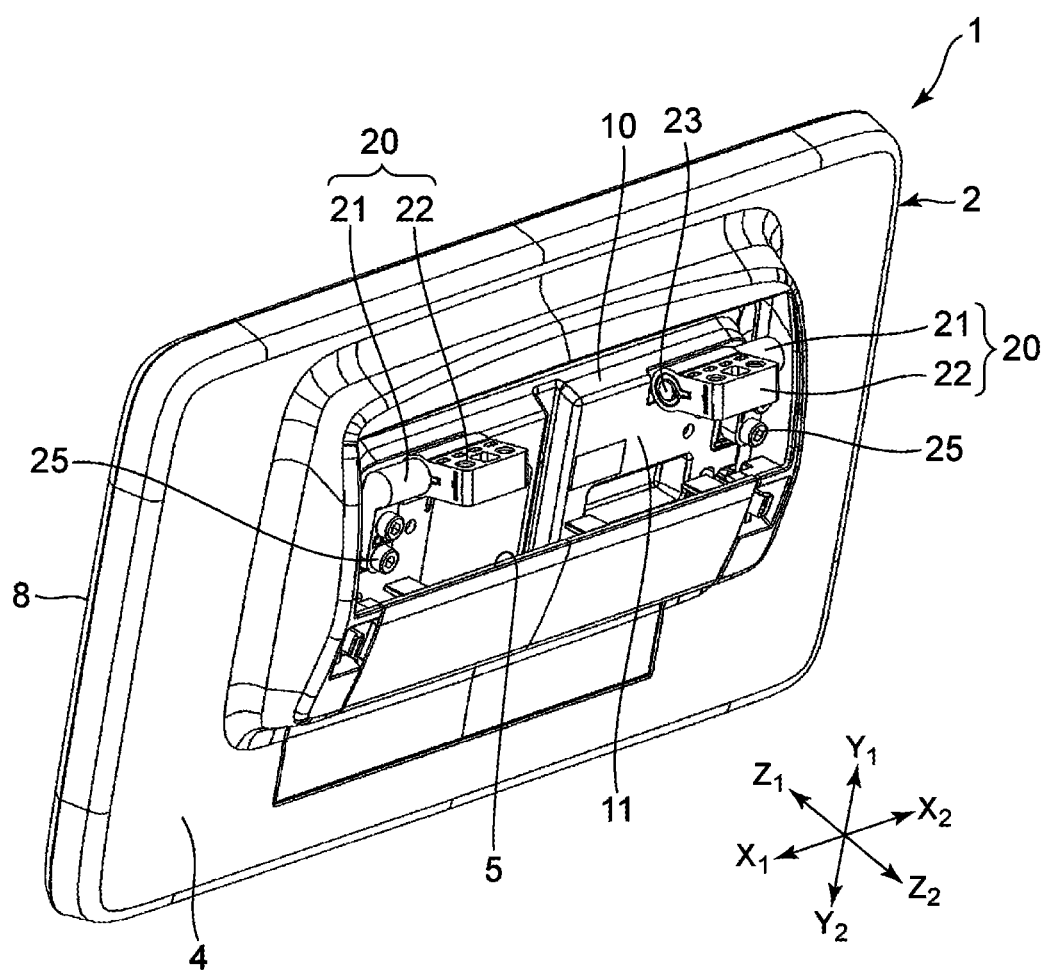
FIG. 2 is a perspective view of the vehicle-mounted device illustrated in FIG. 1 as viewed from the front of the vehicle.
Figure 3:
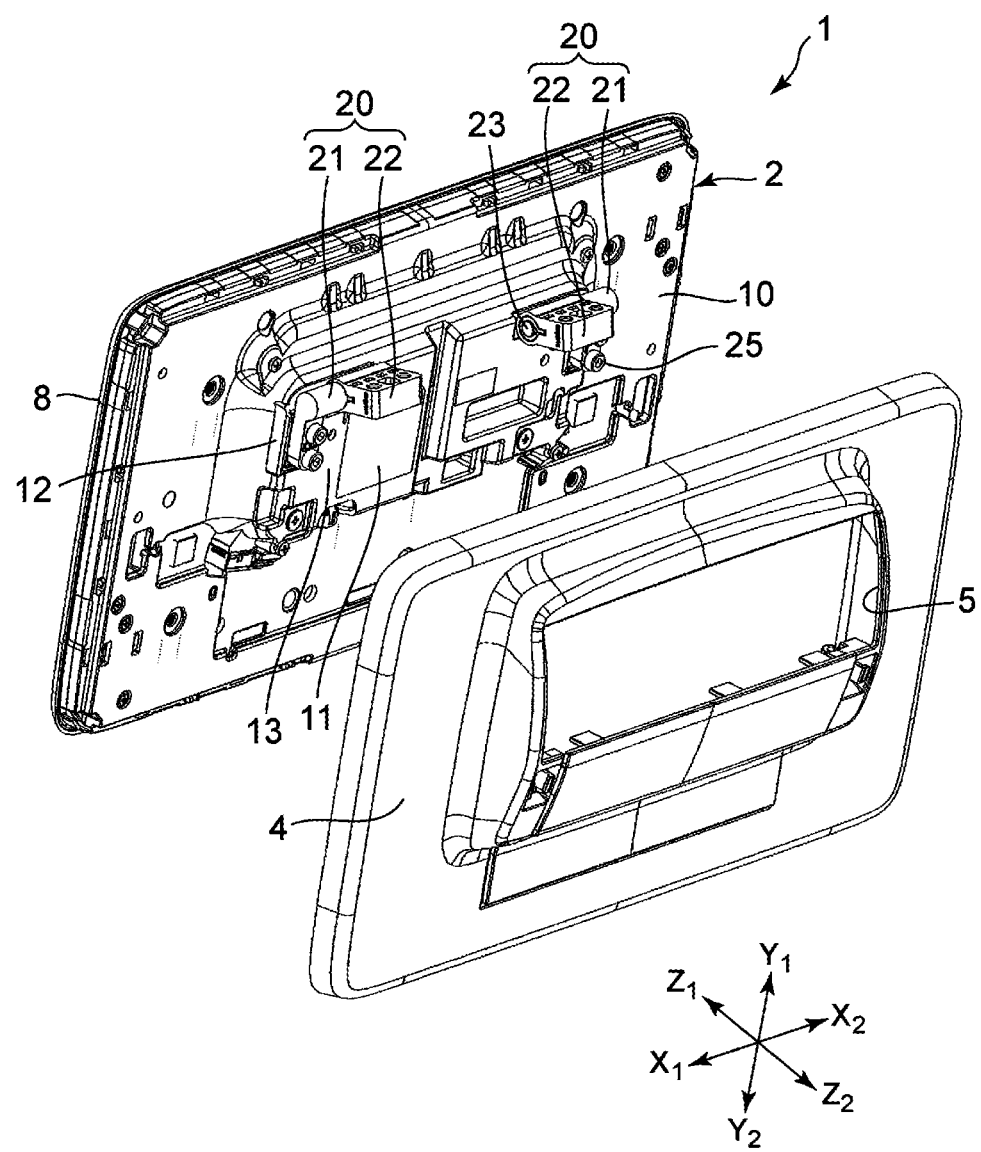
FIG. 3 is a perspective view of the vehicle-mounted device illustrated in FIG. 2 with a front cover removed.

FIGS. 1 to 7 illustrate a vehicle-mounted device 1 according to a first embodiment of the present invention. The vehicle-mounted device 1 is a vehicle-mounted display device. In FIGS. 1 to 7, a Z1 direction is the rearward direction opposite to the traveling direction of the vehicle, and the Z2 direction is a forward direction, which is the traveling direction of the vehicle. A Y1 direction is the upward direction, and a Y2 direction is the downward direction. As viewed from the front, an X1 direction is the left direction, and an X2 direction is the right direction. As illustrated in FIGS. 2 and 3, the vehicle-mounted device 1 includes a device main body 2 and a support member 20 for fixing the device main body 2 to a vehicle.

As illustrated in FIGS. 2 and 3, the device main body 2 has a device base 10, which is part of the device main body 2. The device base 10 is made by die casting using a light metal material, such as zinc or a zinc alloy. The surface of the device base 10 facing rearward (the Z1 direction) is a concave surface, and an electronic circuit board and a display cell are accommodated in the device base 10. The display cell is a color liquid crystal display cell or an electroluminescence display cell. The display screen of the display cell is directed rearward (the Z1 direction), and the rear surface (the Z1 direction) of the display cell is covered by a translucent display cover panel 8. The front (the Z2 direction) of the device base 10 is covered by a front cover 4. The front cover 4 is made of a synthetic resin material or a light metal material.

Part of the device base 10 is a base wall 11. The base wall 11 is a wall portion facing frontward (the Z2 direction) and having the device base 10 attached thereto. The base wall 11 has at least one of a flat wall surface and a curved wall surface. As illustrated in FIGS. 2 and 3, the front cover 4 has an opening 5 formed therein. The opening 5 allows part of the base wall 11 to be exposed to the front (the Z2 direction).

Figure 4:
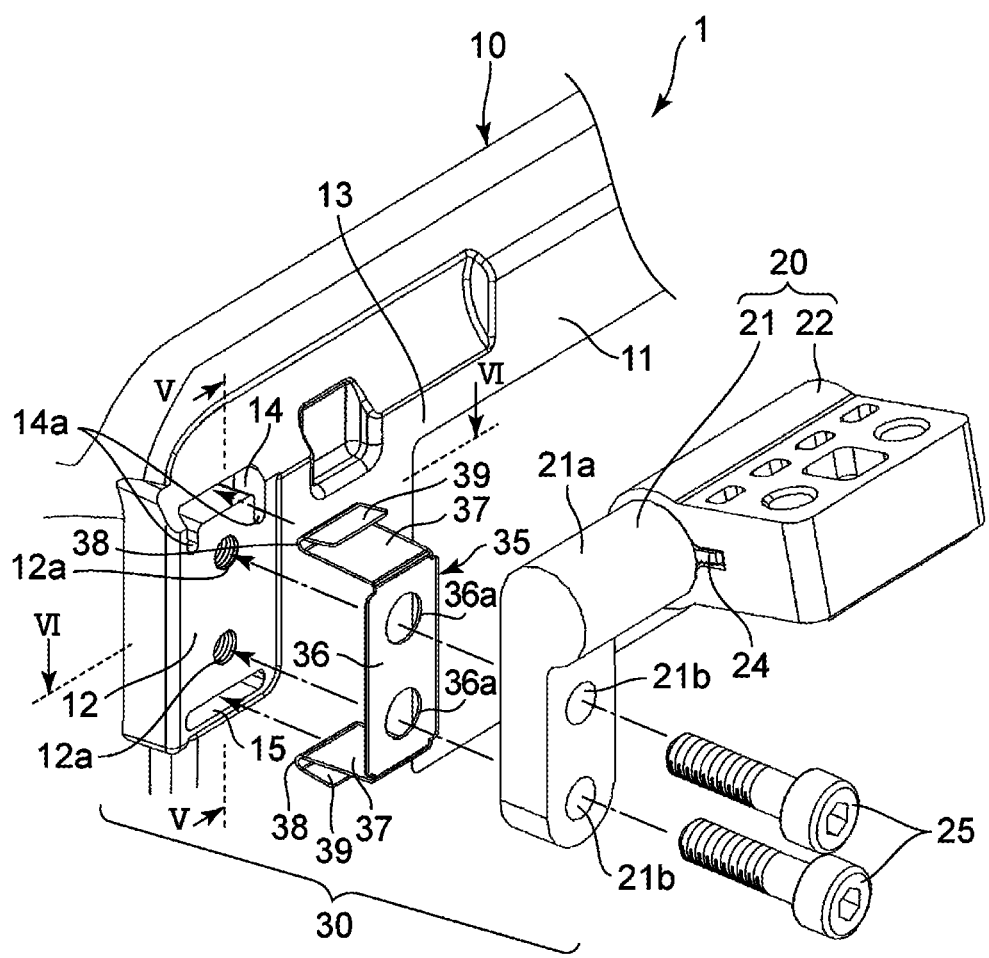
FIG. 4 is a partial exploded perspective view of a device base and a support member of the vehicle-mounted device illustrated in FIG. 3.
Figure 5:
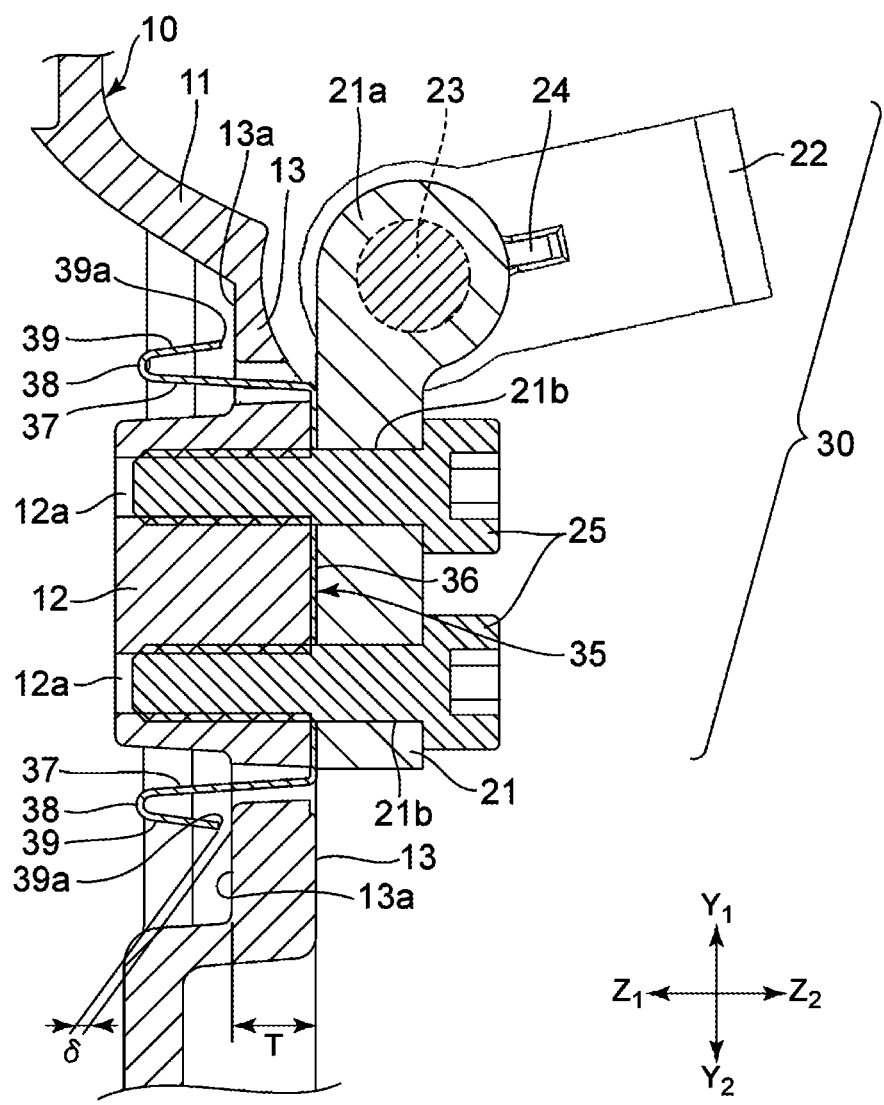
FIG. 5 is a partial cross-sectional view taken along line V-V of FIG. 4 when the support member is attached to the device base.

As illustrated in FIGS. 2 and 3, a pair of support members 20 are attached to the surface of the base wall 11 facing forward (the Z2 direction). The two support members 20 are located away from each other in the left-right direction (the X1-X2 direction). The support member 20 includes a first support member 21 and a second support member 22. As illustrated in FIGS. 4 and 5, the first support member 21 is screwed to the base wall 11 of the device base 10. As illustrated in FIG. 5, a support shaft 23 is fixed to the second support member 22 so as to extend in the left-right direction (the X1-X2 direction). The support shaft 23 is fixed to the second support member 22 by a spline structure 24 so as to be rotatable together with the second support member 22. The first support member 21 has a rotation bearing portion 21a formed therein. The rotation bearing portion 21a is inserted into the support shaft 23 so as to be rotatable with rotational resistance.

As illustrated in FIGS. 1 and 2, the second support members 22 are located inside of the opening 5 of the front cover 4 and protrude forward (the Z2 direction) from the front cover 4. As illustrated in FIG. 1, the second support member 22 is fixed to a fixed bracket 29 by screwing. The fixed bracket 29 is fixed to the vehicle interior. For example, the fixed bracket 29 is fixed to the rear surface of the backrest portion of the front seat in the vehicle interior. Alternatively, the fixed bracket 29 is fixed to the ceiling portion of the vehicle interior. Still alternatively, the fixed bracket 29 is fixed to the dashboard or the internal structure portion of the instrument panel of the vehicle interior. Yet still alternatively, a movable member that goes in and out of a case may be provided in any part of the vehicle interior, and the fixed bracket 29 may be part of the movable member.

FIGS. 4 and 5 illustrate the support member 20 located on the left side (an X1 side) of FIG. 3 and part of the base wall 11. The base wall 11 has a support fixing portion 12 formed thereon. The support fixing portion 12 has a female screw hole 12a formed therein. The female screw hole 12a is used to attach the first support member 21 to the support fixing portion 12. In the base wall 11, a region other than the left and right support fixing portions 12, that is, a region surrounding the support fixing portion 12 is a base main body portion 13.

Figure 6:
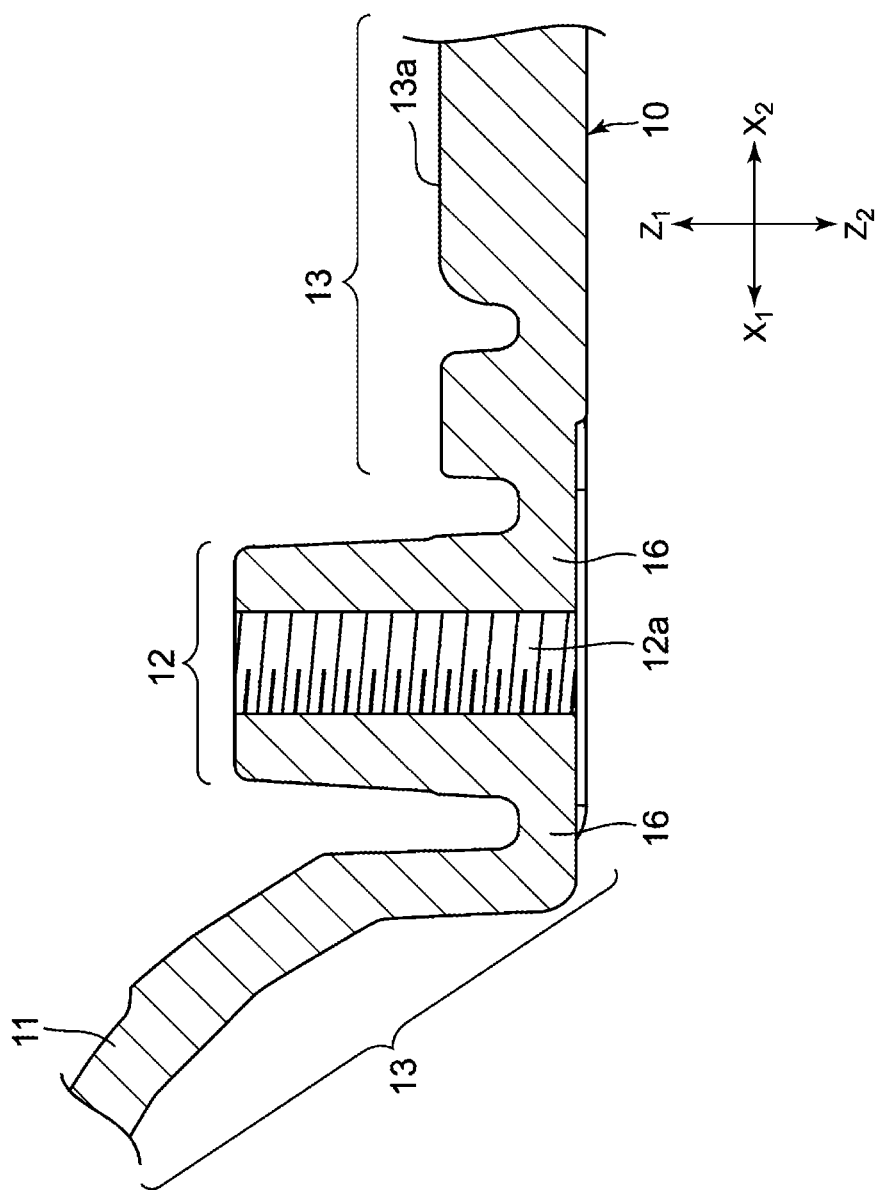
FIG. 6 is a partial cross-sectional view of the device base taken along line VI-VI of FIG. 4.

As illustrated in FIGS. 4 and 5, in the base wall 11, an upper hole portion 14 is formed at a boundary portion between the upper end portion of the support fixing portion 12 and the base main body portion 13 so as to penetrate in the front-rear direction. In addition, a lower hole portion 15 is formed at a boundary portion between the lower end portion of the support fixing portion 12 and the base main body portion 13 so as to penetrate in the front-rear direction. The base wall 11 has small concave portions 14a, 14a that continuously extend downward from the left and right ends of the upper hole portion 14. Preferential rupture portions 16, 16 are formed from the left and right small concave portions 14a, 14a to the lower hole portion 15. As illustrated in FIG. 6, the preferential rupture portions 16, 16 are thin-walled portions that extend in the vertical direction (the Y1-Y2 direction), and these thin-walled portions are grooves formed on the inner surface of the base wall 11 at the rear (the Z1 direction) so as to extend in the vertical direction. In a portion of the base wall 11 that faces the opening 5 of the front cover 4, a portion surrounded by the upper hole portion 14, the lower hole portion 15, and the left and right preferential rupture portions 16, 16 is the support fixing portion 12. The other region surrounding the support fixing portion 12 is the base main body portion 13. Note that the preferential rupture portion 16 may be thin-walled portions or grooves intermittently formed in the vertical direction. Alternatively, the preferential rupture portion 16 may be a portion that has a thickness the same as the other portion and that has a plurality of long holes or round holes arranged at intervals in the vertical direction so as to penetrate in the front-rear direction.

As illustrated in FIGS. 4 and 5, the first support member 21 has a pair of fixing holes 21b formed therethrough. Fixing screws 25 are inserted into the fixing holes 21b and are screwed into the female screw holes 12a of the support fixing portion 12. In this manner, the device base 10 is fixed to the support member 20. The support fixing portion 12 and the support member 20 fixed to the support fixing portion 12 constitute a rupture fixed portion 30. If the base wall 11 ruptures at the preferential rupture portion 16, the base main body portion 13 of the device base 10 is separated from the rupture fixed portion 30.

As illustrated in FIGS. 4 and 5, the rupture fixed portion 30 has a hook member 35 attached thereto. The hook member 35 is formed by bending a metal plate having elasticity (a spring property). For example, a spring stainless steel plate is used as the metal plate. The hook member 35 has a fixed plate portion 36 and elastic pieces 37 located at either end of the fixed plate portion 36 in the vertical direction. Each of the elastic pieces 37 is bent rearward (the Z1 direction) from the fixed plate portion 36. In the top end of each of the elastic pieces 37, a hooking portion (a hooking piece) 39 is formed via a folded-back portion 38 so as to be directed forward (the Z2 direction). As illustrated in FIG. 5, as viewed from the side (the X1-X2 direction), the folded-back portion 38 is bent into a U shape (or V shape), and the elastic piece 37 and the hooking portion 39 face each other and extend forward (the Z2 direction). The inner angle between the elastic piece 37 and the hooking portion 39 is an acute angle. In addition, the fixed plate portion 36 has a pair of through-holes 36a formed therein.

An operation of attaching the hook member 35 and the support member 20 to the device base 10 of the device main body 2 is described below. As illustrated in FIGS. 4 and 5, in the support member 20, the support shaft 23 fixed to the second support member 22 is connected to the rotation bearing portion 21a of the first support member 21 in a rotatable manner with a predetermined rotational resistance force.

As illustrated in FIG. 3, with the front cover 4 removed from or attached to the device main body 2, the folded-back portion 38 of the hook member 35 is forcibly inserted rearward (the Z1 direction) into the upper hole portion 14 formed in the upper region of the support fixing portion 12 and the lower hole portion 15 formed in the lower region of the support fixing portion 12. Since the hook member 35 is formed with a metal plate having elasticity, the hooking portion 39 deforms so as to move closer to the elastic piece 37 inside each of the upper hole portion 14 and the lower hole portion 15. Thus, the hook member 35 is forcibly pushed rearward (in the Z1 direction). As illustrated in FIG. 5, when the elastic pieces 37 completely pass through the upper hole portion 14 and the lower hole portion 15, the elastic piece 37, the folded-back portion 38, and the hooking portion 39 return to their original shapes by the elastic restoring force of the hook member 35. As a result, a front end portion 39a of the hooking portion 39 is directed to an inner side portion 13a of the base main body portion 13 of the device base 10 that faces the inner side of the device with a gap δ therebetween. Alternatively, the front end portion 39a is in contact with the inner side portion 13a.

After the hook member 35 is attached to the device base 10, the first support member 21 is placed in contact with the front surface of the fixed plate portion 36 of the hook member 35. Thereafter, the fixing screws 25 are inserted into the fixing holes 21b of the first support member 21 and the through-holes 36a formed in the fixed plate portions 36 and are screwed into the female screw holes 12a formed in the support fixing portion 12. If the fixing screws 25 are tightened, the hook member 35 is clamped between the support fixing portion 12 and the first support member 21 and, thus, the hook member 35 and the first support member 21 are fixed to the support fixing portion 12.

In the rupture fixed portion 30, the hook member 35 is mounted on the device base 10 without falling off by simply inserting the hook member 35 into the upper hole portion 14 and the lower hole portion 15. Thereafter, the hook member 35 and the first support member 21 are fixed to the support fixing portion 12 with the same fixing screws 25. Since the operation of attaching only the hook member 35 is not required, the number of parts and the number of assembly steps can be reduced.

As illustrated in FIG. 1, the vehicle-mounted device 1 having the support member 20 attached to the front surface of the device base 10 is installed in the vehicle interior by screwing the second support member 22 to the fixed bracket 29. Since in the support member 20, the first support member 21 is rotatably supported by the second support member 22 using the support shaft 23 that acts as a fulcrum, a user can change the direction in which the display screen faces by holding and rotating the device main body 2 by hand.

Figure 7:
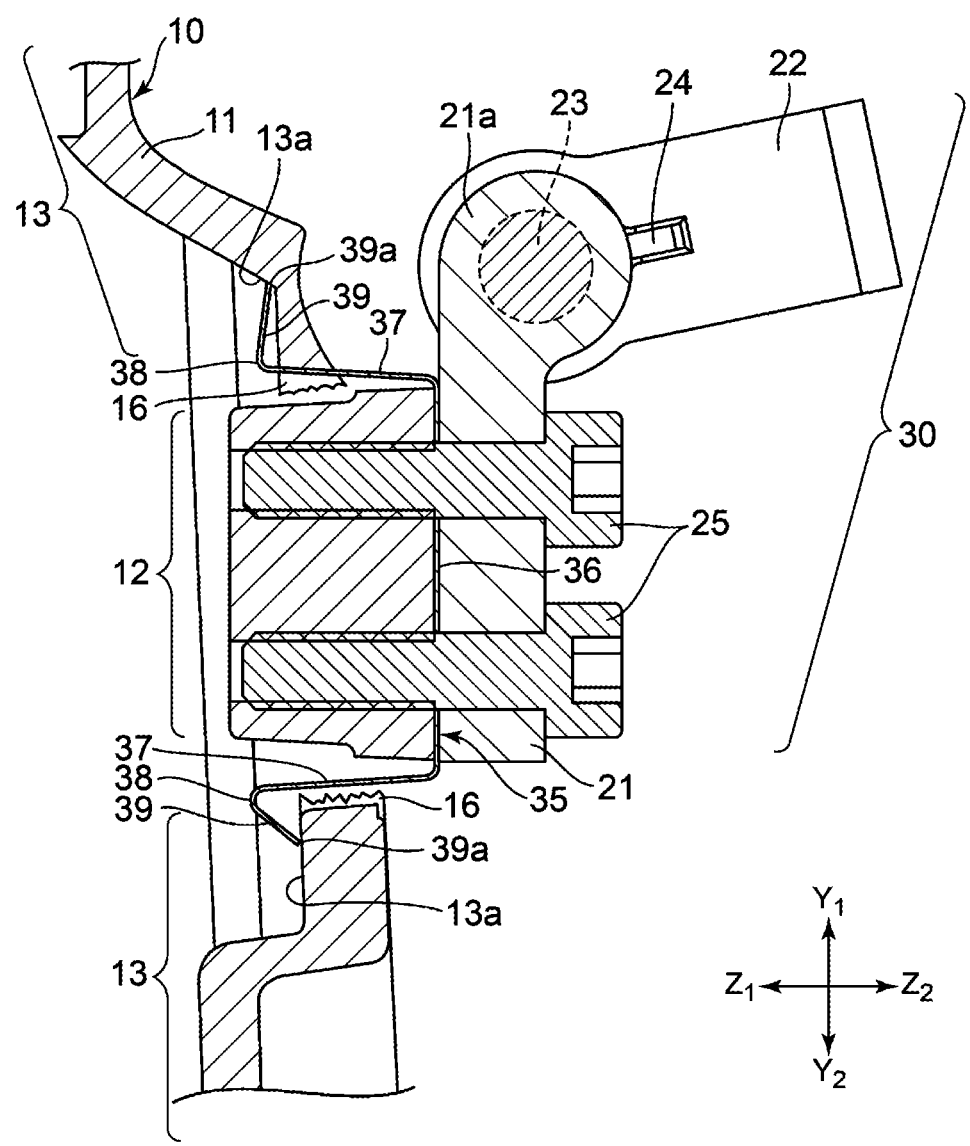
FIG. 7 is a partial cross-sectional view of a ruptured preferential rupture portion of the device base, which corresponds to FIG. 5.

If, for example, part of the human body hits the device main body 2 of the vehicle-mounted device 1 due to a large impact that acts on the vehicle, a forward (Z2 direction) impact force acts on the device main body 2. In this case, in the base wall 11 of the device base 10, stress concentrates on the preferential rupture portions 16 located on either side of the support fixing portion 12 illustrated in FIG. 6. Thus, the base wall 11 ruptures at the preferential rupture portions 16 first. If the human body hits the device main body 2, an impact of the device main body 2 on, for example, the human body can be reduced since the device base 10 ruptures at the preferential rupture portions 16. After the preferential rupture portions 16 rupture, the base main body portion 13 of the device base 10 is separated from the rupture fixed portion 30, and the device main body 2 is about to fall off from the rupture fixed portions 30. At this time, as illustrated in FIG. 7, the front end portions 39a, 39a of the hooking portions 39, 39 provided on the hook member 35 are hooked to the inner side portions 13a of the base main body portion 13 of the device base 10. Thus, the device main body 2 that remains after the rupture of the preferential rupture portions 16 is prevented from falling off from the rupture fixed portion 30.

In the vehicle-mounted device 1, the support fixing portion 12 and the base main body portion 13 are provided in the base wall 11 facing forward (in the forward direction of the device main body 2). For this reason, if the device base 10 ruptures at the preferential rupture portions 16, a ruptured portion of the device base 10 does not protrude rearward (the Z1 direction) beyond the device main body 2, that is, towards a passenger. In this manner, the safety of the passenger can be ensured.

In the vehicle-mounted device 1, the support fixing portion 12 and the preferential rupture portions 16 are provided in the base wall 11 of the device base 10, and the hook member 35 is in plane contact with the support fixing portion 12 and is fixed to the support fixing portion 12. Therefore, as illustrated in FIG. 5, an increase in the dimension in the front-rear direction due to the hook member 35 that is attached is equal to only the plate thickness of the fixed plate portion 36 of the hook member 35, and the depth of the device can be reduced. In addition, as illustrated in FIG. 5, when the preferential rupture portion 16 does not rupture, the front end portion 39a of the hooking portion 39 faces the inner side portion 13a of the base main body portion 13 of the device base 10 with a small gap δ therebetween or without a gap (the front end portion 39a is in contact with the inner side portion 13a). In this manner, when the preferential rupture portion 16 ruptures, the device main body 2 is not spaced considerably away from the rupture fixed portion 30 rearward (in the Z1 direction). Therefore, the device main body 2 does not hang down too far, and the possibility of the ruptured surface at the preferential rupture portion 16 protruding rearward beyond the device main body 2 is further reduced. For example, it is desirable that the distance δ be set to a value less than or equal to a thickness T of the base main body portion 13 at a portion which the front end portion 39a of the hooking portion 39 is in contact with.

As illustrated in FIGS. 5 and 7, the pair of elastic pieces 37, 37 of the hook member 35 extend inward of the device base 10 at a position at which the support fixing portion 12 is clamped vertically. Accordingly, if the preferential rupture portions 16 rupture and, thus, the support fixing portion 12 separates from the base main body portion 13, the base main body portion 13 is supported by the upper and lower elastic pieces. Therefore, even when the rigidity of the hook member 35 is not excessively large, the device main body 2 can be sufficiently supported by the upper and lower hooking portions 39 so as not to be separated from the rupture fixed portion 30. In addition, the hook member 35 is formed with an elastic metal plate. For this reason, as illustrated in FIG. 7, if the preferential rupture portions 16 rupture and, thus, the device main body 2 is about to fall by its own weight, the folded-back portion 38 and the hooking portion 39 of the hook member 35 elastically deform. In this manner, the drop impact of the device main body 2 can be reduced.

Furthermore, according to the device base 10, as illustrated in FIG. 4, the support fixing portion 12 and the base main body portion 13 are partitioned by an upper hole portion 14 and the lower hole portion 15 in the vertical direction (the Y1-Y2 direction). In addition, as illustrated in FIG. 6, the support fixing portion 12 and the base main body portion 13 are partitioned by the preferential rupture portions 16, 16 in the left-right direction (the X1-X2 direction). Consequently, when an impact is applied to the main body portion 3 from the outside, the base main body portion 13 and the support fixing portion 12 can be separated such that the support fixing portion 12 still retains a substantially rectangular shape. In addition, the small concave portions 14a, 14a are formed on either side of the upper hole portion 14. The preferential rupture portions 16, 16 are continuously formed from the small concave portions 14a, 14a in the vertical direction or are formed in parallel to the small concave portions 14a, 14a in the vertical direction. In this manner, the preferential rupture portions 16, 16 are easily ruptured by the small concave portions 14a, 14a.

Figure 8:
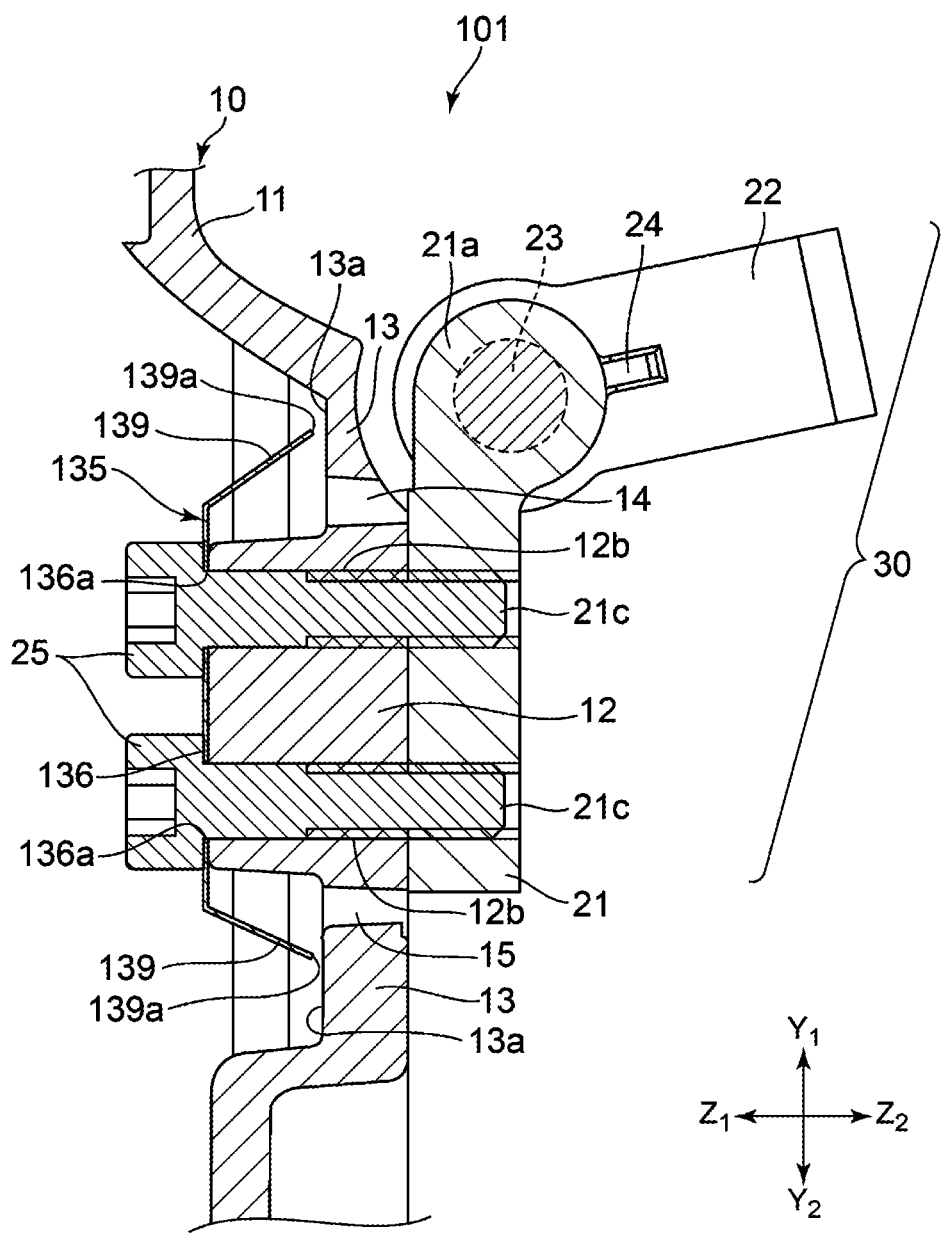
FIG. 8 is a partial cross-sectional view of a vehicle-mounted device according to a second embodiment of the present invention, which corresponds to FIG. 5.
Figure 9:
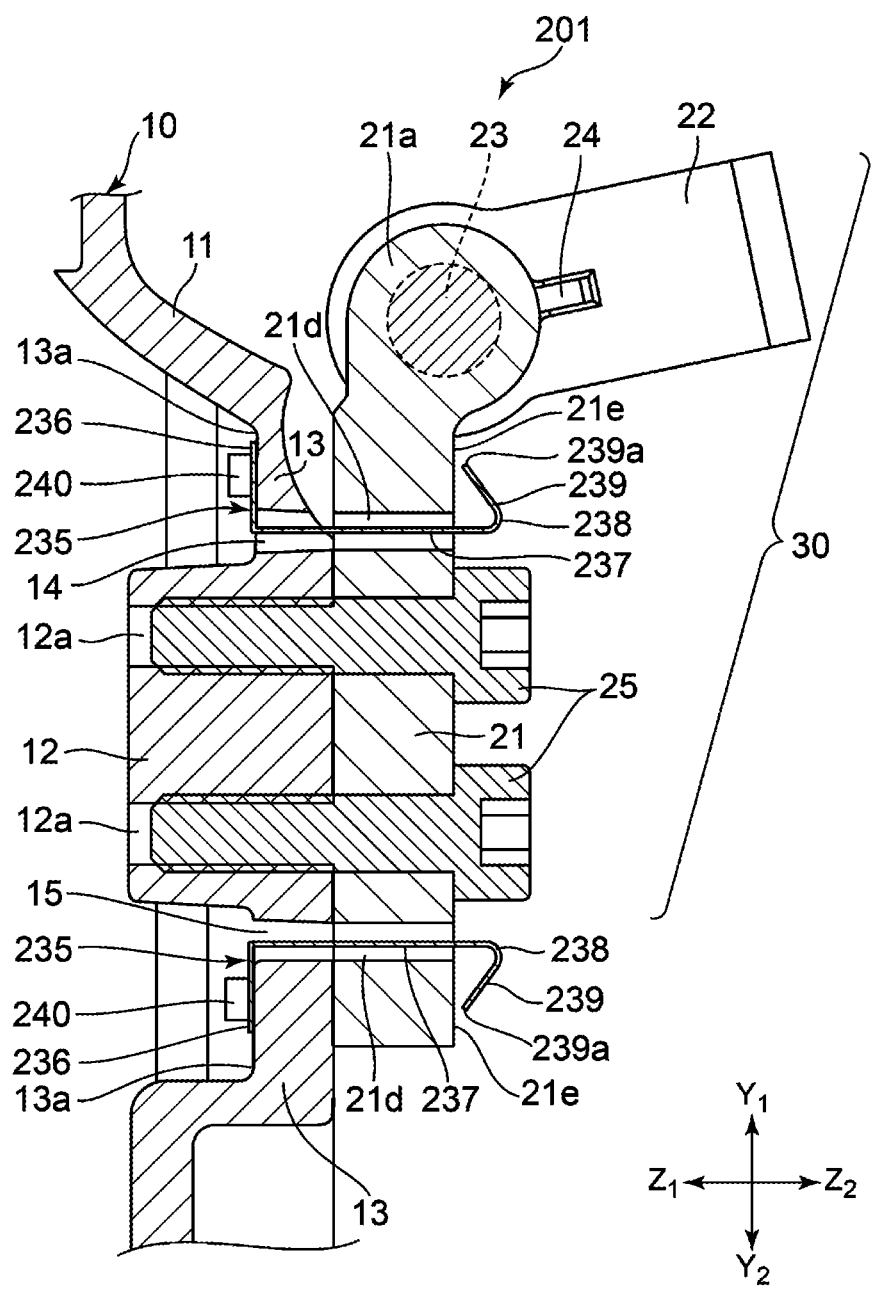
FIG. 9 illustrates a vehicle-mounted device according to a third embodiment of the present invention, which corresponds to FIG. 5.

FIG. 8 illustrates part of a vehicle-mounted device 101 according to a second embodiment of the present invention. FIG. 9 illustrates part of a vehicle-mounted device 201 according to a third embodiment. The same reference numerals are used in the second and third embodiments to describe those members that are identical to the members of the vehicle-mounted device 1 according to the first embodiment illustrated in FIGS. 1 to 7, and detailed description of the members are not given.

According to the vehicle-mounted device 101 of the second embodiment illustrated in FIG. 8, a fixing hole 12b is formed in the support fixing portion 12 that is part of the base wall 11 of the device base 10, and a female screw hole 21c is formed in the first support member 21. A hook member 135 is formed with a metal plate. It is desirable that the hook member 135 be a metal plate having elasticity (a spring property), such as a stainless steel plate. The hook member 135 has a through-hole 136a formed in a fixed plate portion 136 thereof. The hook member 135 is mounted on the inner surface of the support fixing portion 12 from the inside of the device main body 2, and the fixing screw 25 is inserted into the through-hole 136a of the fixed plate portion 136 and is further inserted into the fixing hole 12b of the support fixing portion 12. Thereafter, the fixing screw 25 is screwed into the female screw hole 21c of the first support member 21. In this manner, the first support member 21 is fixed to the support fixing portion 12. In addition, a rupture fixed portion 30 having the hook member 135 attached thereto is formed.

The vehicle-mounted device 101 is easy to assemble because the first support member 21 and the hook member 135 are fixed to the support fixing portion 12 with the same fixing screw 25. At either end of the hook member 135 in the vertical direction, hooking portions (hooking pieces) 139 bent forward (in the Z2 direction) are formed. A front end 139a of the hooking portion 139 faces the inner side portion 13a of the base main body portion 13, or the front end 139a is in contact with the inner side portion 13a. If an impact force of the device main body 2 is exerted in the vehicle-mounted device 101 illustrated in FIG. 8, the device base 10 ruptures at the preferential rupture portion 16. Thereafter, the front end 139a of the hooking portion 139 is brought into contact with the inner side portion 13a of the base main body portion 13 and, thus, the device main body 2 can be prevented from falling off from the rupture fixed portion 30.

Like the vehicle-mounted device 1 according to the first embodiment, in the vehicle-mounted device 201 according to the third embodiment illustrated in FIG. 9, the first support member 21 is fixed to the support fixing portion 12 of the device base 10 by the fixing screw 25. Thus, the rupture fixed portion 30 is formed. The first support member 21 has through-holes 21d, 21d formed therein. The through-holes 21d, 21d are arranged with a gap therebetween in the vertical direction. Each of hook members 235 is formed with a metal plate. It is desirable that the hook member 235 be formed with a metal plate having elasticity (a spring property). The hook members 235 are arranged in the vertical direction with the support fixing portion 12 therebetween. Note that the upper and lower hook members 235 may be separate members or may be connected into one body. The hook member 235 has a fixed plate portion 236 and an elastic piece 237 integrally formed therein. The elastic piece 237 is bent forward (the Z2 direction) from the fixed plate portion 236. At the front end of the elastic piece 237, a hooking portion (a hooking piece) 239 is formed via a folded-back portion 238.

The hook member 235 is elastically deformed such that the elastic piece 237 and the hooking portion 239 move closer to each other. The folded-back portions 238 are inserted forward (the Z2 direction) into the upper hole portion 14 and the lower hole portion 15 of the device base 10 and are further inserted into the through-holes 21d of the first support member 21. When the hooking portion 239 completely passes through the through-hole 21d, the folded-back portion 238 returns to its original shape by its elasticity. Thus, a front end portion 239a of the hooking portion 239 faces an outer side portion 21e of the first support member 21 which is the outer side portion of the rupture fixed portion 30, or the hooking portion 239 is in contact with the outer side portion 21e. In this mounted state, the fixed plate portion 236 is fixed to the inner side portion 13a of the base main body portion 13 by a fixing screw 240. Note that the front end portion 239a of the hooking portion 239 may face or be in contact with the outer surface (the outer side portion) that faces frontward of the support fixing portion 12.

According to the vehicle-mounted device 201 illustrated in FIG. 9, if the preferential rupture portion 16 of the device base 10 ruptures and, thus, the device main body 2 is separated from the rupture fixed portion 30, the hooking portion 239 of the hook member 235 fixed to the base main body portion 13 is hooked to the outer side portion 21e of the first support member 21 which is the outer side portion of the rupture fixed portion 30. In this manner, the device main body 2 can be prevented from falling down, and the rupture portion of the device base 10 can be prevented from protruding rearward (the Z1 direction) beyond the device main body 2.

In each of the above embodiments, the hooking portions 39, 39 of the hook member 35, the hooking portions 139, 139 of the hook member 135, or the hooking portions 239, 239 of the hook member 235 are arranged in the vertical direction (the Y1-Y2 direction) with the support fixing portion 12 therebetween. However, the hook members may be arranged in the left-right direction (the X1-X2 direction) with the support fixing portion 12 therebetween. Alternatively, the hook member may have only one hooking portion.

Furthermore, according to the above embodiments, each of the vehicle-mounted devices 1, 101, and 201 is a vehicle-mounted display device. However, the vehicle-mounted display device of the present invention may be of any usage type, as long as it can be installed in a vehicle interior (for example, another electronic device or a communication apparatus).

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-mounted device comprising:
   a device main body;
   a device base that is part of the device main body; and
   a support member configured to support the device base on a vehicle side,
   wherein the device base has formed therein a support fixing portion to which the support member is fixed, a base main body portion other than the support fixing portion, and a preferential rupture portion between the support fixing portion and the base main body portion,
   wherein the support fixing portion and the support member attached to the support fixing portion constitute a rupture fixed portion, and the base main body portion is separable from the rupture fixed portion if the preferential rupture portion ruptures, and
   wherein one of the rupture fixed portion and the base main body portion is provided with a hook member, and the hook member is provided with a hooking portion that is hooked to the other of the rupture fixed portion and the base main body portion when the base main body portion separates from the rupture fixed portion.

2. The vehicle-mounted device according to claim 1, wherein the device base is provided with a base wall, and the support fixing portion and the base main body portion are part of the base wall.

3. The vehicle-mounted device according to claim 2, wherein the hooking portion of the hook member is provided at least at two points on opposite sides of the support fixing portion.

4. The vehicle-mounted device according to claim 3, wherein the hook member is attached to the rupture fixed portion, and the hooking portion is hookable to an inner side portion of the base main body portion facing an inside of the device main body.

5. The vehicle-mounted device according to claim 4, wherein the hook member is formed with a metal plate having elasticity, the metal plate has a folded-back portion, and a front end portion of the folded-back portion serves as the hooking portion,
   wherein the device base has a hole portion formed therein between the support fixing portion and the base main body portion, and wherein the hook member is elastically deformed and passes through the hole portion so that the hooking portion is hookable to the inner side portion of the base main body portion.

6. The vehicle-mounted device according to claim 5, wherein the support member is attached to the support fixing portion by using a fixing screw and the hook member is attached to the support fixing portion by using the fixing screw.

7. The vehicle-mounted device according to claim 3, wherein the hook member is attached to the base main body portion, and the hooking portion is hookable to an outer side portion of the rupture fixed portion facing the outside of the device main body.

8. The vehicle-mounted device according to claim 7, wherein the hooking portion is formed with a metal plate having elasticity.

9. A vehicle-mounted device comprising:
a device body;
a support member configured to support the device body,
wherein the device body has formed therein a support fixing portion to which the support member is fixed and a preferential rupture portion between the support fixing portion and a remainder of the device body,
wherein the support fixing portion and the support member attached to the support fixing portion constitute a rupture fixed portion, and the remainder of the device body is separable from the rupture fixed portion if the preferential rupture portion ruptures, and
wherein one of the rupture fixed portion and the remainder of the device body is provided with a member having an elastic engaging portion that is engaged to the other when the remainder of the device body separates from the rupture fixed portion.

10. The vehicle-mounted device according to claim 9, wherein the device body is provided with a base wall, and the support fixing portion is part of the base wall.

11. The vehicle-mounted device according to claim 10, wherein the elastic engaging portion of the member is provided at least at two points on opposite sides of the support fixing portion.

12. The vehicle-mounted device according to claim 11, wherein the member is attached to the rupture fixed portion, and the elastic engaging portion is configured to engage an inner side portion of the base wall facing an inside of the device body.

13. The vehicle-mounted device according to claim 12, wherein the member is formed with a metal plate having elasticity, the metal plate has a folded-back portion, and a front end portion of the folded-back portion serves as the elastic engaging portion,
wherein the base wall has a hole portion formed therein between the support fixing portion and the remainder of the base wall, and
wherein the member is elastically deformed and passes through the hole portion so that the elastic engaging portion is configured to engage the inner side portion of the base wall.

14. The vehicle-mounted device according to claim 13, wherein the support member is attached to the support fixing portion by using a fixing screw and the hook member is attached to the support fixing portion by using the fixing screw.

15. The vehicle-mounted device according to claim 11, wherein the member is attached to the base wall, and the elastic engaging portion is configured to engage an outer side portion of the rupture fixed portion facing the outside of the device body.

16. The vehicle-mounted device according to claim 15, wherein the elastic engaging portion is formed with a metal plate having elasticity.

* * * * *